United States Patent [19]

Caban-Domenech

[11] Patent Number: 5,278,540
[45] Date of Patent: Jan. 11, 1994

[54] ELECTROMECHANICAL EARTHQUAKE ALARM

[76] Inventor: Alipio Caban-Domenech, P.O. Box 1784, Mayaguez, P.R. 00681

[21] Appl. No.: 933,205

[22] Filed: Aug. 21, 1992

[51] Int. Cl.$^5$ ............................................. G01W 1/00
[52] U.S. Cl. .................................... 340/601; 340/690; 200/61.45 R; 200/61.52
[58] Field of Search ............... 340/601, 689, 690, 669, 340/321; 200/61.52, 61.45 R; 73/652; 33/366, 365

[56] References Cited

U.S. PATENT DOCUMENTS

| | | |
|---|---|---|
| 1,625,625 | 4/1927 | Ricker . |
| 3,990,039 | 11/1976 | Miller . |
| 4,086,807 | 5/1978 | Nakada ................................. 73/652 |
| 4,364,033 | 12/1982 | Tsay ..................................... 340/690 |
| 4,689,997 | 9/1987 | Windisch ......................... 340/690 X |
| 4,764,761 | 8/1988 | Maguire, III ....................... 340/690 |
| 4,775,854 | 10/1988 | Cottrell .......................... 340/689 X |
| 4,789,922 | 12/1988 | Cheshire .......................... 340/690 X |

Primary Examiner—Jeffrey Hofsass
Attorney, Agent, or Firm—Frank H. Foster; Kremblas, Foster & Millard

[57] ABSTRACT

An earthquake sensor in which a weight falls from a support surface and activates a switch in the event of an earthquake. The support surface is preferably a bell with its opened end downward and the weight resting on a concave, recessed region at the closed end of the bell. The bell is preferably supported by a shaft along the axis of the bell, the tip of which the bell pivots about like a pendulum. A conductive cylinder encircles the bell near its bottom. When the earth moves, the weight falls down the inclined surface of the bell, wedging between the bell and the cylinder, forcing the bell to pivot over to electrically connect the bell to the cylinder. In an alternative embodiment, the weight electrically connects the bell and the cylinder, and the bell does not pivot.

27 Claims, 4 Drawing Sheets

ELECTROMECHANICAL EARTHQUAKE ALARM

TECHNICAL FIELD

The invention relates to the field of seismic wave detectors, and more specifically to electromechanical earthquake alarms.

BACKGROUND ART

When an earthquake occurs, the more time people have to respond, the fewer will be the number of people who are injured. Earthquake alarms serve the purpose of sensing motion of the earth's surface and warning those nearby of that motion. Many elaborate and sophisticated seismic measuring devices exist, but are unfortunately not affordable for most people.

There has been a need for an inexpensive earthquake alarm that is effective. Many of the proposed solutions to this need are machines which must remain ready over long periods of time without sounding but need to be reliably functional when an earthquake occurs. The alarms are needed by a wide variety of people who all must be able to install, operate and maintain the alarm. Therefore, the alarm should require the least amount of attention and when maintenance is necessary, it should be simple.

Alarms which have been described in U.S. Pat. Nos. 4,689,997, 4,364,033, 3,990,039 and 1,625,625, have a pendulum body which is moved by the motion of the earth's surface. The pendulum's motion results in producing a signal warning people of the earthquake. These types of alarms suffer from being too insensitive to the earth's motion. Alarms which are sensitive enough are too difficult to set up and maintain due to their sensitivity. Another alarm, which is disclosed in U.S. Pat. No. 4,086,807, has a ball that is magnetically held in place which is moved out of place by the earthquake, sounding an alarm.

There is a need for a simply functioning earthquake alarm that is sensitive to earthquakes and yet is easy to install, operate and maintain. The alarm should also remain Operable after being dormant for long periods of time, and should require a minimum of attention and maintenance.

BRIEF DISCLOSURE OF INVENTION

The invention is an electromechanical earthquake alarm, having an open electrical circuit that is closed by an earthquake sensor. The closure of the electrical circuit activates a signalling device to warn people nearby. An improved earthquake sensor comprises a support surface, upon which a weight, such as a metal ball, is balanced. A switch is activated when the weight is displaced from the support surface due to the motion of the earth's surface. Preferably, the support surface is formed on top of the skirt portion of a bell which is pivotally supported.

The switch that is activated may be the weight falling between and causing the electrical connection of two surfaces, thereby closing an electrical circuit.

Figure 1:
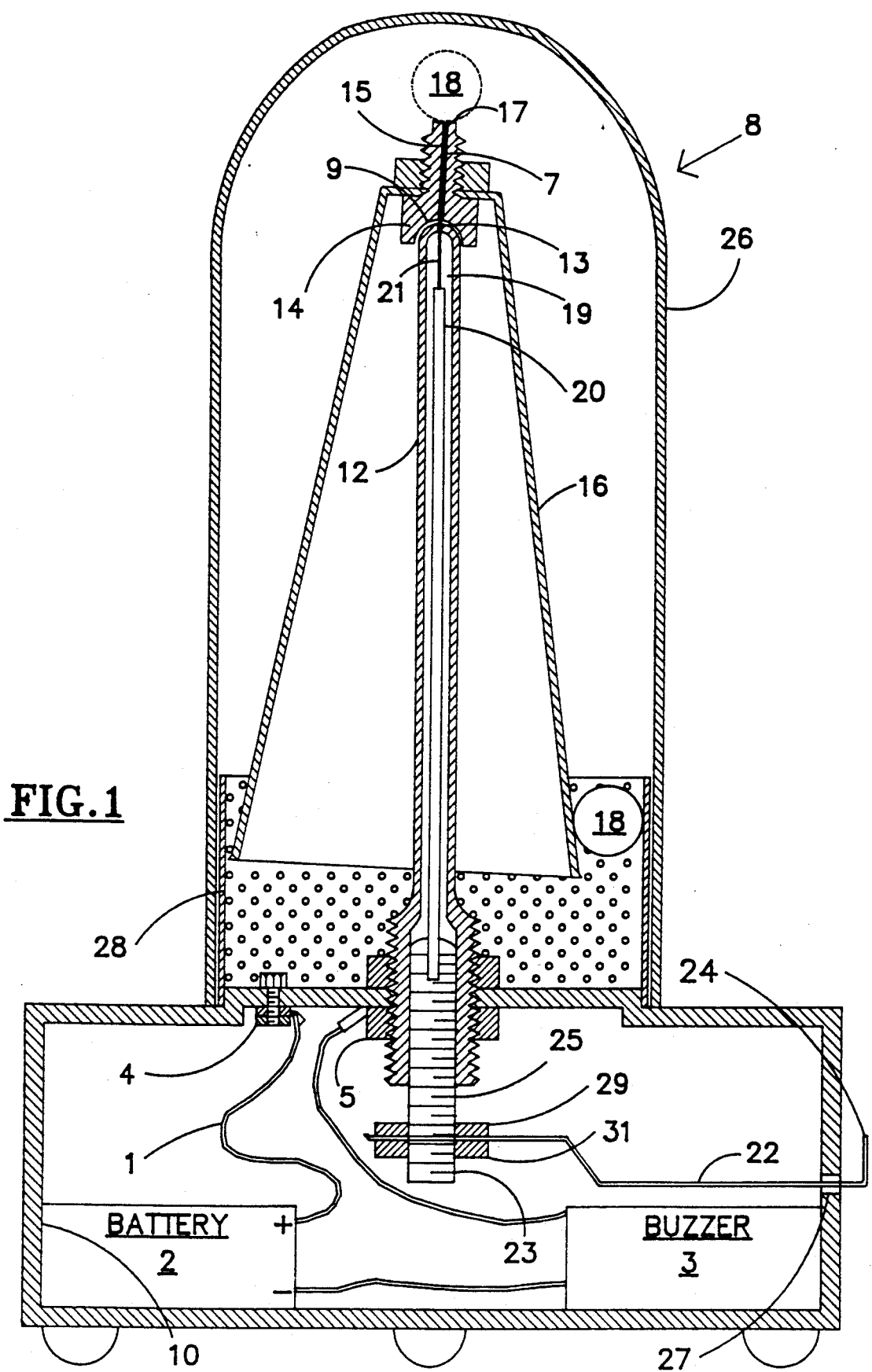
FIG. 1 is a view in section illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

Figure 5:
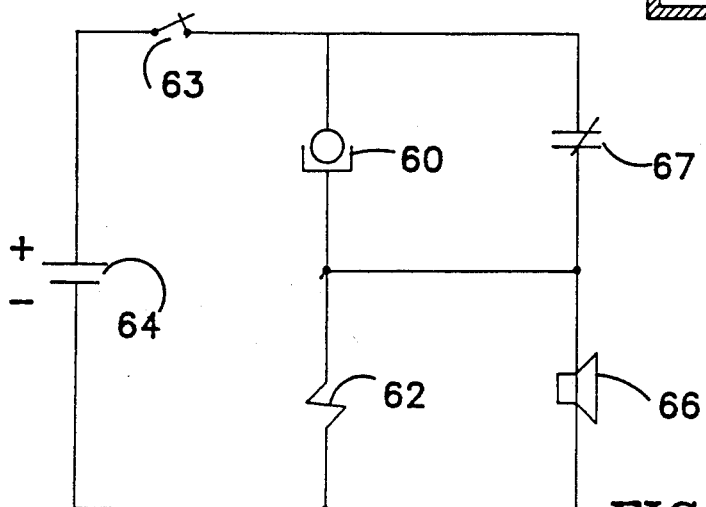
FIG. 5 is a schematic diagram of a preferred electrical circuit.

The preferred embodiment of the present invention is an earthquake alarm 8, illustrated in FIG. 1, having a box-shaped, hollow base 10 which houses the elements of an electronic circuit 11 shown in FIG. 5. The base 10 contains a battery 2, a piezoelectric ceramic buzzer 3 and the remaining elements of the electronic circuit 11 which are not visible in FIG. 1.

A hollow shaft 12 is attached to the base 10, extending upwardly in FIG. 1 to form a convex tip 13 at the end opposite the base 10. The convex tip 13 of the shaft 12 fits into a concave, matingly engaging socket 9 formed in a socket body 14 forming a "universal joint", allowing multidirectional pivoting between the socket body 14 and the shaft 12. The socket body 14 is rigidly attached to the closed end of a bell 16. The bell 16 is placed over the shaft 12, with its opened end down, the tip 13 of the shaft 12 fitting into the socket 9 of the socket body 14 and the bell 16 balancing on the shaft 12. The lower circumferential edge of the bell 16 forms a circle which is preferably centered on the axis of the shaft 12 when the bell 16 is at equilibrium.

The bell 16 is made of an outwardly flared skirt having a top on it and preferably having a hollow interior. This topped skirt structure is referred to as a bell, but is not limited to a structure shaped exactly like a bell. For example, a cone or cup shaped structure, both of which have an outwardly flared skirt and a top, would function equivalently to the preferred bell.

An inner shaft 20 is coaxial with and mounted within a passage 19 formed through the length of the hollow shaft 12. The inner shaft 20 has a flexible extension 21, such as a fine wire, at one end extending from the hollow shaft 12, through a central passage 7 formed through the socket body 14. The flexible extension 21 of the inner shaft 20 attaches to a vertically slidable pin 15 which extends upwardly into the bottom of a concave recess 17 formed in the top of the socket body 14. The pin 15 contacts a ball 18 which rests in the recess 17 of the socket body 14.

The inner shaft 20, at the end opposite the ball 18, extends into the base 10, and has screw threads 23 formed on its outer circumferential surface. The threads 23 of the inner shaft 20 engage with threads 25 formed in the walls of the passage 19 formed in the hollow shaft 12 at the base 10 end. The inner shaft 20 is threaded through the passage 19 of the hollow shaft 12 and extends into the cavity of the hollow base 10. An arm 22 is rigidly attached perpendicularly to the lower, threaded end of the inner shaft 20 between lock nuts 29 and 31 and extends radially away from the inner shaft 20 through a slot 27 formed in the base 10. A manually operable tab 24 is formed at the end of the arm 22, opposite the inner shaft 20.

The inner shaft 20 can be displaced longitudinally by displacing the arm 22 about the inner shaft 20. This causes the inner shaft 20 to rotate, displacing it longitudinally due to the rotation of the screw threaded portion of the inner shaft 20, within mating screw threads 25 of the hollow shaft 12. The displacement of the inner shaft 20 axially adjusts the pin 15 with respect to the bottom of the recess 17 of the socket body 14 and causes the ball 18, resting in the recess 17, to be displaced toward or away from the lowest position in the recess 17 of the socket body 14.

A preferably transparent, dome-shaped housing 26 encloses the bell 16 and the ball 18 and attaches to the top surface of the base 10. A cylinder 28, formed from a sheet of perforated stainless steel, is attached to the housing 26 or the base 10, encircling the bell 16 and extending coaxially with the shaft 12, upwardly from the base 10. The height of the cylinder 28 is great enough to ensure that sufficient motion of the lower edge of the bell 16, along an arcuate path about the pivot of the tip 13 of the shaft 12, will cause the lower edge of the bell 16 to contact the cylinder 28.

Tabs 4 and 5 are electrically connected to the cylinder 28 and shaft 12, respectively. Wires 1 and 6 connect the tabs 4 and 5 to the battery 2 and buzzer 3, respectively. A wire screen, forced into a cylinder, may be substituted for the cylinder 28 of FIG. 1.

The installation of the alarm 8 illustrated in FIG. 1 begins by the installer lowering the inner shaft 20 to place the pin 15 in a suitable position. The entire apparatus is placed on a solid support, such as a table or shelf. Leveling the alarm 8 is not critical for the preferred embodiment. The ball 18 is placed in the recess 17 formed in the top end of the socket body 14. A manual switch, interposed along the wire 1 or 6, may be added so that a person can manually turn the alarm 8 off, to eliminate the possibility of premature activation of the alarm 8 during installation and to turn off the alarm 8 in the event that it is activated falsely. However, since the contact between the ball 18 and the bell 16 acts as a switch, positioning the ball 18 in place after installation decreases the possibility of false alarm.

The housing 26 is then placed on, and attached to, the base 10. The sensitivity of the alarm 8 is then increased by raising the inner shaft 20 to place the pin 15 in contact with the ball 18 and put the ball 18 in a position of desired instability. As the inner shaft 20 is raised, the pin 15 contacts the ball 18 and beings to push the ball 18 upwards. The ball 18 is, at this time, supported at one point by the edge of the recess 17 formed in the socket body 14 and at a second point by the pin 15 of the inner shaft 20. By further displacing the pin 15 upwards, the center of mass of the ball 18 is moved outward toward the supporting edge of the recess 17. When the ball 18 is moved outward enough that its center of mass is beyond the edge of the recess 17, the ball 18 will fall. This preferably only happens when the ball 18 is moved by an earthquake, or when the pin 15 is intentionally displaced upwardly enough to move the center of mass of the ball 18 beyond the edge of the recess 17.

The sensitivity of the alarm 8 to the motion of the earth's surface is adjusted by adjusting the proximity of the center of mass of the ball 18 to the outer edge of the recess 17. This sensitivity is therefore adjusted by the position of the arm 22 which makes installation of the alarm 8 easier since a person can adjust the sensitivity after the alarm 8 is set up. The sensitivity is affected by other factors, such as the sizes of the ball 18 and the recess 17, but the adjustment of the sensitivity of the particular alarm 8 is done by moving the arm 22.

The ball 18 falls from its position in the recess 17 due to the motion of the surface of the earth with respect to the ball 18, and due to the motion of the bell 16 with respect to the ball 18. The bell 16 is induced into motion by low frequency motion of the earth's surface. The earth's surface moves, and the bell 16 follows, but with a slight delay due to the inertia of the bell 16 trying to maintain its original position. This delay makes the bell 16 swing like a pendulum about its pivot. The swinging of the bell 16 moves the surface on which the ball 18 rests, and the undulations of the earth's surface move the ball 18, and both of these motions combine to move the center of mass of the ball 18 outside the edge of the recess 17 in the socket body 14.

When the ball 18 falls, it rolls down the outer surface, or skirt, of the bell 16 and lodges between the skirt of the bell 16 and the cylinder 28, forcing the opposite edge of the bell 16 against the cylinder 28. The ball 18 causes the bell 16 to be displaced laterally against the cylinder 28 due to the weight of the ball 18 applying a force generally perpendicularly to the outer surface of the bell 16, forming a mechanical moment arm between the pivot of the bell 16 and the point of contact between the bell 16 and the ball 18.

The contact between the bell 16 and the cylinder 28 closes an electrical circuit, sounding an audible alarm. In the preferred embodiment, the hollow shaft 12, socket body 14, the cylinder 28, and bell 16 are all electrically conductive, preferably stainless steel.

When the bell 16 and cylinder 28 are electrically connected, current flows through the electrical circuit that is connected to the bell 16 and to the cylinder 28. In this way the ball 18, the bell 16 and the cylinder 28 function as a switch which closes the electrical circuit. The ball 18 is also preferably stainless steel, which is electrically conductive, and able to redundantly electrically connect the bell 16 with the cylinder 28 when the ball 18 is lodged between them.

The ball 18 falling from the recess 17 and forcing the bell 16 to touch the cylinder 28 is one way in which the alarm 8 can be activated. The second way in which the alarm 8 can be activated is if the motion of the earth causes the lower edge of the bell 16 to contact the cylinder 28 before the ball 18 has a chance to fall. This second way of being activated is what makes the alarm 8 what is referred to as "double sensing" and demonstrates the effectiveness and the sensitivity of the preferred alarm 8 to any motion of the surface of the earth. Stated briefly, double sensing describes the ability of the alarm 8 to be activated in one way when the ball 18 falls and forces the edge oft he bell 16 against the cylinder 28, as well as a second way of the bell 16 contacting the cylinder 28 before the ball 18 has a chance to fall from the recess 17.

A preferred electronic circuit 11 is illustrated in FIG. 5 and shows the switch-forming contacts 60 between the cylinder 28 and the bell 16. These are connected in series with a relay holding coil 62, an on/off switch 63, which as stated before, is optional, and a battery 64. A piezoelectric sound alarm 66 is connected in parallel with the relay holding coil 62. A relay contact 67 is connected in parallel with the contacts 60, and together with the relay holding coil 62, makes a latching relay. The switch 63 is switched to "on", and when an electrical connection is made between the cylinder 28 of FIG. 1 and the bell 16, the electronic circuit 11 shown in FIG. 5 is then closed at the contacts 60. This causes current to flow through the relay holding coil 62, closing the relay contact 67, holding the circuit on. Current also flows through the piezoelectric alarm 66, sounding it. If the contacts 60 are subsequently opened, current will still flow through the latching relay, sounding the piezoelectric alarm 66. A wide variety of electronic circuits could be used to perform the described task of sounding an alarm after contact, and the circuit 11 is only one example of such a circuit.

Figure 2:
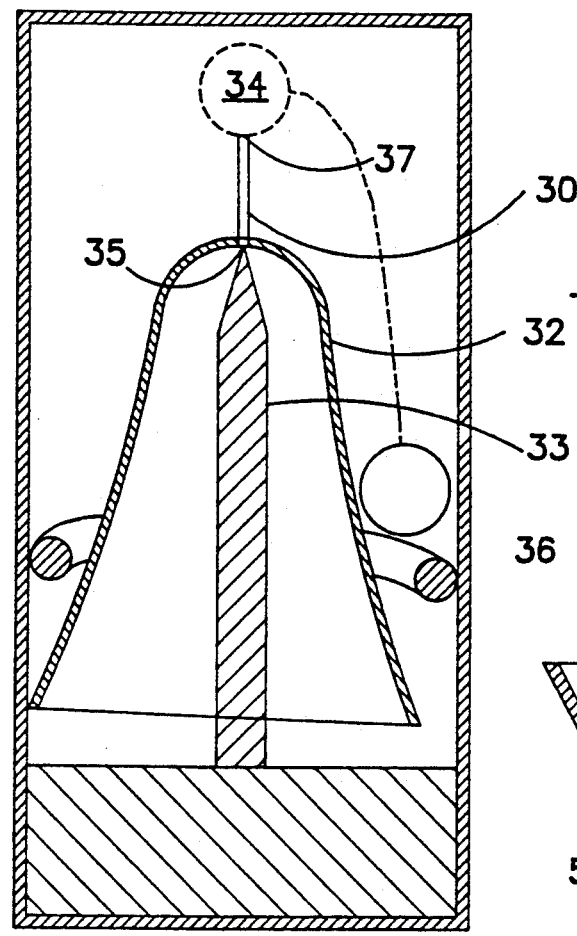
FIG. 2 is a view in section illustrating an alternative embodiment to the present invention.

An alternative earthquake alarm embodiment is shown in FIG. 2 in which an extension shaft 30 is attached to a bell 32 near a pivot point 35 of the bell 32 resting on a conically tipped support shaft 33. The extension shaft 30 has a recessed seat 37 at its upper end opposite the bell 32 on which a ball 34 rests. The extension shaft 30 causes the ball 34 to be held a greater distance from the pivot of the bell 32, giving the ball 34 a greater linear velocity for a given angular velocity of the bell 32, than would be the case in the preferred embodiment. The extension shaft 30 therefore adds to the probability that the ball 34 will fall for a given amount of motion of the surface of the earth due to the increase in velocity of the ball 34. This means the size of the recess 37 the ball 34 rests in can be increased to make it more difficult for the ball 34 to fall out of it, since the overall sensitivity of the device has been increased. Increasing the size of the recess 37 aids in installation of the ball 34 in the recess 37. A ring 36, which encircles the bell 32 in FIG. 2, is a substitute for the cylinder 28 of FIG. 1. The bell 32 again is made up of an outwardly flared skirt with a top.

The extension shaft 30 of the embodiment of FIG. 2, raises the center of mass of the combination of the bell 32 and the ball 34. Therefore, mass is desirably added to the bell 32 below the pivoting point to lower the center of mass.

Figure 3:
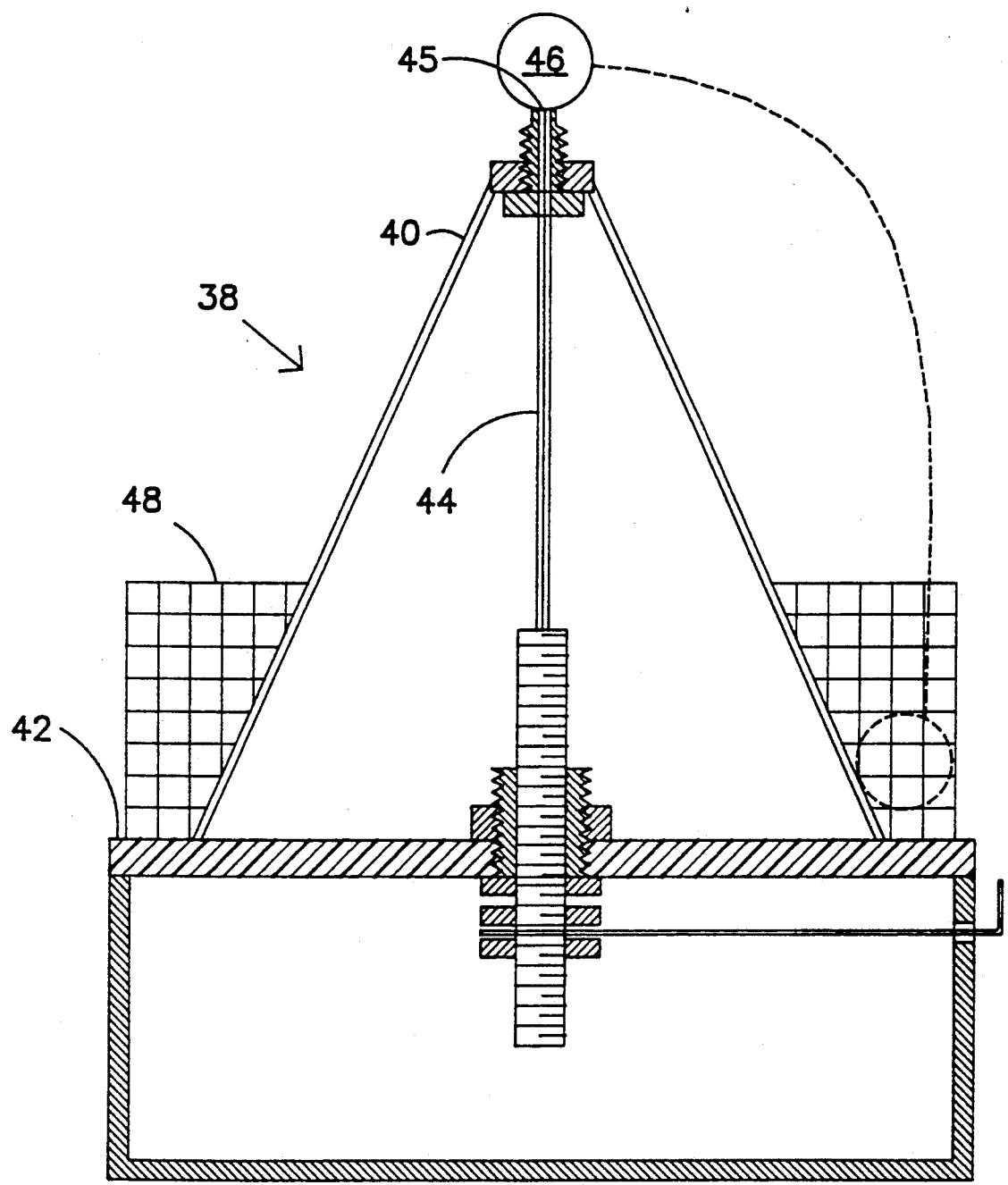
FIG. 3 is a view in section illustrating yet another alternative embodiment to the present invention.

FIG. 3 shows an alternative alarm 38 having a cone 40, having an outwardly flared skirt with a top on it, which is mounted to a base 42 with the opened end of the cone 40 downward, and supported at its lower edge. The alarm 38 is very similar to the alarm 8 shown in FIG. 1 in that the alarm 38 also has a shaft 44 which extends from the base 42 through the opened end to the closed end of the cone 40. The shaft 44 is longitudinally displaced by a mechanism similar to that of the alarm 8 in FIG. 1. The difference between the alarm 8 and the alarm 38 is that the cone 40 of the alarm 38 does not move with respect to the base 42, even under the motion of an earthquake. A ball 46 rests on a recess 45 formed at the peak of the cone 40, and rolls down the surface of the cone 40 when it is displaced due to the motion of the surface of the earth. The ball 46 lodges between the cone 40 and a wire mesh 48, but the cone 40 does not pivot over to the wire mesh 48. Therefore, the ball 46 must be electrically conductive in the alarm 38 since it must electrically connect the cone 40 to the wire mesh 48.

Figure 4:
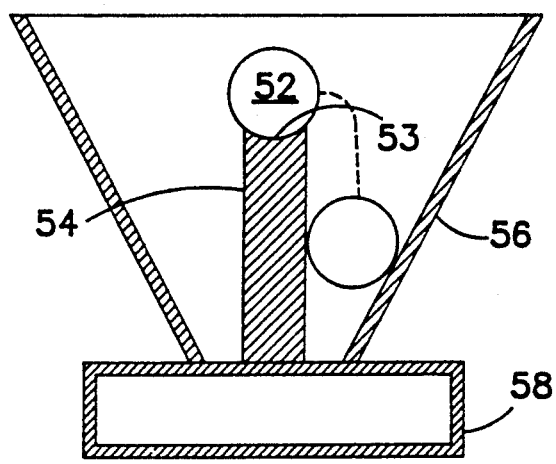
FIG. 4 is a view in section illustrating still another alternative embodiment to the present invention.

Another alternative alarm 50, shown in FIG. 4, has a ball 52 resting in a recess 53 formed in the tip of a shaft 54. A cone 56 is rigidly attached to a hollow, box-shaped base 58 and the cone 56 has its opened end pointing upward. Under the motion of the earth, the ball 52 falls from the recess 53 in the shaft 54 and becomes lodged between the cone 56 and the shaft 54. The ball 52 in this embodiment must be electrically conductive.

Figure 6:
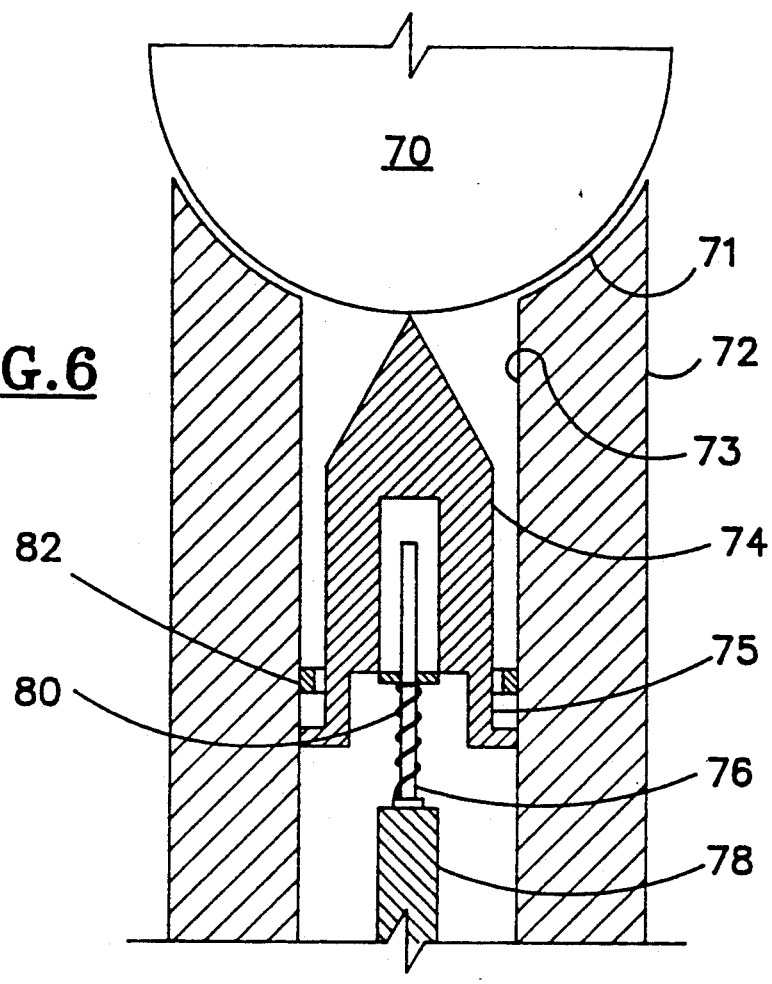
FIG. 6 is a view in section illustrating an alternative switching means.

FIG. 6 shows an alternative switching mechanism for closing the electronic circuitry of an earthquake alarm and may be substituted for the pivoting bell or inverted cone type of switch shown in FIGS. 1, 2, 3 and 4. FIG. 6 shows a ball 70 resting in a recess 71 formed on a hollow shaft 72. A switching mechanism is placed within a chamber 73 formed in the hollow shaft 72. The switching mechanism includes a pin 74 which is coaxial with a guide rod 76. The guide rod 76 extends from a connecting cylinder 78, and the guide rod 76 has a coil spring 80 encircling it and extending coaxially, longitudinally from the base of the pin 74 to the connecting cylinder 78. The pin 74 has a skirt 75 at its lower end which extends outward to slidingly engage the walls of the hollow shaft 72. Electrical contact ring 82 encircles the skirt 75 extending from its attachment to the walls of the chamber 73. The weight of a ball 70 placed in the recess 71 forces the pin 74 against the spring 80, lowering the pin 74 completely into the chamber 73, separating the skirt 75 from the electrical contact ring 82, as shown in FIG. 6. When the ball 70 is displaced from the recess 71, the pin 74 is forced upward by the spring 80, causing an electrical connection to be formed between the skirt 75 and the electrical contact ring 82. This contact is equivalent to the ball wedging between the cone or bell and the wire mesh or ring, causing an electrical contact, and acting as a switching mechanism to close an electrical circuit of an earthquake alarm.

Figure 7:
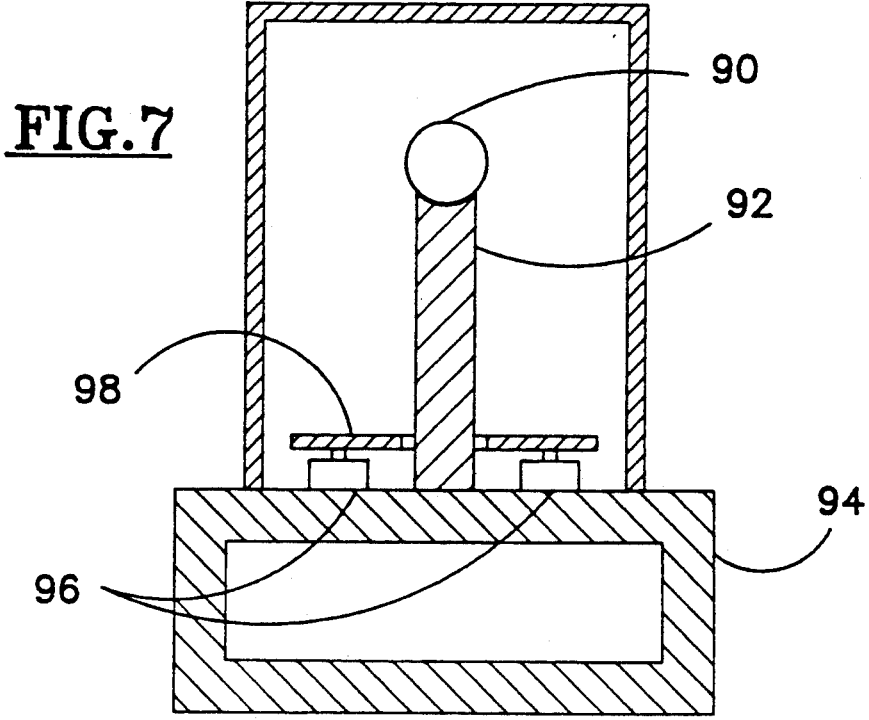
FIG. 7 is a view in section illustrating an earthquake alarm having an alternative switching means.

FIG. 7 shows an alternative switching mechanism for an earthquake alarm. FIG. 7 shows a ball 90, resting on a shaft 92, that is connected to a base 94. A circular disk 98 encircles the shaft 92, near where the shaft 92 connects to the base 94. The disk 98 rests on top of a plurality of electrical switches 96, which are activated by depression. When the ball 90 falls from the top of the shaft 92, it falls onto the disk 98, depressing at least one of the switches 96, which closes an electrical circuit of the earthquake alarm.

The embodiment of FIGS. 6 and 7 show two ways in which an equivalent electrical switch may completely or partially replace or substitute for a ball or a weight wedging between a pair of surfaces of opposite electrical charge, causing an electrical connection.

For the embodiment of FIG. 1, a light emitting diode (LED) may be incorporated to be activated when the ball 18 contacts the tip 17 of the pin 15. This would indicate minimum sensitivity of the alarm 8. When the ball 18 falls during adjustment of the arm 22, the LED will be deactivated, thus indicating maximum sensitivity has been exceeded.

Additionally, the base 10 may have a scale of calibration markings at the slot 27 for the tab 24. This would allow a person to calibrate the tab 24 on the scale according to minimum and maximum sensitivity.

While certain preferred embodiments of the present invention have been disclosed in detail, it is to be understood that various modifications may be adopted without departing from the spirit of the invention or scope of the following claims.

I claim:

1. In an earthquake alarm having an open electrical circuit that is closed by an earthquake sensor, activating a signalling device, an improved earthquake sensor comprising:
   (a) an electrically conductive skirt having a support surface and an inclined outer surface along substantially its full length that is connected to the electrical circuit;
   (b) an electrical conductor encircling the skirt, connected to the circuit; and
   (c) an electrically conductive weight balanced on the support surface of the skirt, for being displaced from its balanced position on the skirt by the motion of the earth'surface, rolling down the inclined surface of the skirt to a position between and simultaneously contacting both the skirt and the encircling conductor, electrically connecting the skirt and encircling conductor, thereby closing the circuit.

2. An improved earthquake sensor in accordance with claim 1 wherein the encircling conductor is a stainless steel ring.

3. An improved earthquake sensor in accordance with claim 1 wherein the encircling conductor is a hollow, stainless steel cylinder forming a loop around the skirt and having a plurality of perforations through the cylindrical surface.

4. An improved earthquake sensor in accordance with claim 1 wherein the skirt is a hollow, stainless steel cone mounted with its opened end downward and its axis directed perpendicularly to the surface of the earth.

5. An improved earthquake sensor in accordance with claim 1 wherein the skirt is hollow, bell-shaped, stainless steel cup, mounted with its opened end downward and its axis directed perpendicularly to the surface of the earth.

6. An improved earthquake sensor in accordance with claim 5 wherein the bell shaped cup is supported by a metal shaft extending upward along the axis of the cup, through the opened end of the cup and supporting the cup at its closed end.

7. An improved earthquake sensor in accordance with claim 6 wherein the support surface of the cup is a concave recess formed in the closed end of the cup.

8. An improved earthquake sensor in accordance with claim 7 wherein a second, vertically movable, flexible shaft extends through a passageway formed in the metal support shaft, and extends through the cup to contact the weight for adjusting the vertical positioning of the weight.

9. An earthquake sensor in accordance with claim 8 wherein the cup is attached to the metal support shaft by a universal joint and the second, flexible, vertically moveable shaft is nylon.

10. An earthquake sensor in accordance with claim 9 wherein the nylon shaft is attached to a screw threaded rod, mounted in a screw threaded hole, having an arm rigidly mounted perpendicular to the axis of the rod and, moving the arm about the axis of the rod rotates the rod, changing the vertical position of the rod and the nylon shaft.

11. An improved earthquake sensor in accordance with claim 1 wherein the weight is a sphere.

12. An improved earthquake sensor in accordance with claim 4 wherein the electrically conductive skirt, encircling conductor and weight are stainless steel.

13. An earthquake alarm having an open electrical circuit that is closed by an earthquake sensor, activating a sound producing device, an improved earthquake sensor comprising:
   (a) an electrically conductive skirt mounted on a fixed support, about which it is free to pivot under the influence of gravity and having a support surface and an inclined outer surface that is connected to the electrical circuit;
   (b) an electrical conductor encircling the skirt, connected to the circuit; and
   (c) a weight balanced on the support surface of the skirt, for being displaced from its balanced position on the skirt to a lower position between the encircling conductor and the inclined surface of the skirt due to the motion of the earth's surface, forcing an edge of the skirt against the encircling conductor, thereby closing the circuit.

14. An improved earthquake sensor in accordance with claim 13 wherein the weight is conductive and, while forcing an edge of the skirt against the encircling conductor, also electrically connects the encircling conductor with the skirt.

15. An improved earthquake sensor in accordance with claim 13 wherein the encircling conductor is a stainless steel ring.

16. An improved earthquake sensor in accordance with claim 13 wherein the encircling conductor is a stainless steel mesh screen forming a loop around the skirt.

17. An improved earthquake sensor in accordance with claim 13 wherein the skirt is a hollow, stainless steel cone mounted with its opened end downward and its axis directed perpendicularly to the surface of the earth.

18. An improved earthquake sensor in accordance with claim 13 wherein the skirt is a hollow, bell-shaped, stainless steel cup, mounted with its opened end downward and its axis directed perpendicularly to the surface of the earth.

19. An improved earthquake sensor in accordance with claim 18 wherein the bell shaped cup is supported by a metal shaft extending upward along the axis of the cup, through the opened end of the cup and supporting the cup at its closed end.

20. An improved earthquake sensor in accordance with claim 19 wherein the support surface of the cup is a concave recess formed in the closed end of the cup.

21. An improved earthquake sensor in accordance with claim 20 wherein a second, vertically movable, flexible shaft extends through a passageway formed in the metal support shaft, and extends through the cup to contact the weight for adjusting the vertical positioning of the weight.

22. An earthquake sensor in accordance with claim 21 wherein the cup is attached to the metal support shaft by a universal joint and the second, flexible, vertically moveable shaft is nylon.

23. An earthquake sensor in accordance with claim 22 wherein the nylon shaft is attached to a screw threaded rod, mounted in a screw threaded hole, having an arm rigidly mounted perpendicular to the axis of the rod and, moving the arm about the axis of the rod rotates the rod, changing the vertical position of the rod and the nylon shaft.

24. An earthquake sensor in accordance with claim 13 wherein a rod extends from a pivot point of the skirt, away from a center of mass of the skirt, and the weight balances on the end of the rod opposite the axis of the skirt.

25. An improved earthquake sensor in accordance with claim 13 wherein the weight is a sphere.

26. An improved earthquake sensor in accordance with claim 13 wherein the skirt is a pendulum.

27. An improved earthquake sensor in accordance with claim 13 wherein the electrically conductive structures are stainless steel.

* * * * *